(12) United States Patent
Aoki

(10) Patent No.: US 7,382,579 B2
(45) Date of Patent: Jun. 3, 2008

(54) MAGNETIC HEAD STRUCTURE

(75) Inventor: Kenichiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 11/156,902

(22) Filed: Jun. 20, 2005

(65) Prior Publication Data
US 2006/0215316 A1  Sep. 28, 2006

(30) Foreign Application Priority Data
Mar. 23, 2005  (JP) ............... 2005-084056

(51) Int. Cl.
*G11B 5/147* (2006.01)
(52) U.S. Cl. .................................... 360/126
(58) Field of Classification Search .......... 360/126
See application file for complete search history.

(56) References Cited

U.S. PATENT DOCUMENTS

| | | | | |
|---|---|---|---|---|
| 5,270,893 | A | * | 12/1993 | Sasaki et al. ............. 360/318 |
| 6,002,555 | A | * | 12/1999 | Tagawa ..................... 360/126 |
| 6,538,845 | B1 | | 3/2003 | Watanabe et al. |
| 6,614,620 | B2 | | 9/2003 | Tagawa et al. |
| 2002/0057527 | A1 | | 5/2002 | Sasaki |
| 2003/0223156 | A1 | | 12/2003 | Yuito et al. |
| 2004/0051996 | A1 | | 3/2004 | Kautzky et al. |

FOREIGN PATENT DOCUMENTS

| | | |
|---|---|---|
| EP | 1 398 763 | 3/2004 |
| JP | 63-108516 | 5/1988 |
| JP | 63-275012 | 11/1988 |
| JP | 2000-306213 | 11/2000 |
| JP | 2004-99055 | 4/2004 |
| KR | 2002-0033016 | 5/2002 |

* cited by examiner

*Primary Examiner*—Angel Castro
(74) *Attorney, Agent, or Firm*—Greer, Burns & Crain, Ltd.

(57) ABSTRACT

A magnetic head structure capable of reducing the quantity of protrusion of a portion of a floating surface, at which a coil is located, toward a disk has been disclosed. The head comprises a coil 22, a magnetic pole 26 allowing a magnetic flux generated by the coil to transmit therethrough and forming a magnetic gap 24, an insulating layer 32 surrounding the coil, and a protective film 34 covering the insulating layer and the magnetic pole and, if a first direction is defined as that in which the side of the floating surface 16 of the magnetic head structure extends when viewed in the direction in which the coil, the magnetic pole, the insulating layer, and the protective film are laminated, and a second direction is defined as that perpendicular to the first direction, the ratio of the maximum length of the insulating layer in the first direction to that in the second direction is equal to or greater than 1.5.

6 Claims, 8 Drawing Sheets

MAGNETIC HEAD STRUCTURE

BACKGROUND OF THE INVENTION

The present invention relates to a magnetic head structure used in a magnetic disk apparatus.

A magnetic disk apparatus includes a plurality of disks and a plurality of magnetic head structures inserted between the disks. The magnetic head structure is provided in a magnetic head slider. The surface of the magnetic head slider facing the disk is called a floating surface. The magnetic head structure comprises a coil, a magnetic pole allowing a magnetic flux generated by the coil to transmit therethrough and forming a magnetic gap, an insulating layer surrounding the coil, and a protective film covering the insulating layer and the magnetic pole, with these members being provided on a substrate forming the magnetic head slider. Due to the magnetic gap, data can be written into the disk. Further, a shield and a reading element (MR element) are arranged on the substrate.

When data are written into the disk, an electric current is supplied to the coil. The electric current flowing through the coil generates a magnetic flux, and the magnetic flux leaking in the magnetic cap of the magnetic pole writes data into the disk. On the other hand, when data are read from the disk, data are read by the MR element. Recently, the quantity of floating of the magnetic head slider has been reduced in order to increase the recording density and, for example, the quantity of floating has been reduced to equal to or less than 10 nm.

In the magnetic head structure, the substrate is made of $Al_2O_3$—TiC, the coil is made of copper, the magnetic pole and the shield are made of a magnetic material such as NiFe, the protective film is made of alumina, and the insulating layer is made of a resin material such as a photoresist. In this manner, the whole magnetic head structure is covered with a protective film made of alumina, and the coil and the insulating layer, which have coefficients of thermal expansion different from that of the protective film, are arranged within the magnetic head structure.

The coefficient of thermal expansion of alumina is $5.8 \times 10^{-6}$, the coefficient of thermal expansion of copper is $17.2 \times 10^{-6}$, the coefficient of thermal expansion of Permalloy, which is a magnetic material, is $10 \times 10^{-6}$, and the coefficient of thermal expansion of photoresist is $30-70 \times 10^{-6}$. The coefficient of thermal expansion of copper or magnetic material is approximately two or three times greater than that of alumina. The coefficient of thermal expansion of photoresist is approximately 10 times greater than that of alumina.

When the temperature of the interior in the magnetic disk apparatus rises or when the temperature rises due to the supply of an electric current, a thermal deformation may occur in the magnetic head structure due to the difference in coefficient of thermal expansion of the constituent materials of the magnetic head structure. Such a thermal deformation may cause deformation of the floating surface.

An observation of the deformation in the floating surface reveals a considerable expansion of the insulating layer comprising a photoresist having a great coefficient of thermal expansion and the shield layer comprising a magnetic material and due to this, an unwanted phenomenon, that a portion of the floating surface near the magnetic pole protrudes toward the disk, occurs. If a deformation in the floating surface occurs, the minimum quantity of floating of the magnetic head slider is substantially reduced, and there arises the possibility that a portion of the floating surface near the magnetic pole comes into contact with the disk and reliability may be reduced.

Therefore, it is desirable to reduce the protrusion, of the portion of the floating surface near the magnetic pole, toward the disk.

Conventionally, there is a proposal to reduce the protrusion of the portion of the floating surface near the magnetic pole by changing the materials of the insulating layer and the protective film. For example, in Japanese Unexamined Patent Publication (Kokai) No. 2000-306213, it is proposed that the protective film is divided into two portions, and a material having a higher Young's modulus is used in the portion nearer to the floating surface and a material having a lower Young's modulus is used in the portion more distant from the floating surface. Also, in Japanese Unexamined Patent Publication (Kokai) No. 2000-306215, it is proposed to use a resin having a low glass transition point for the insulating layer. However, as there is a large difference between the coefficient of thermal expansion of the protective film and that of the insulating layer, as described above, and as the shield is also one of the factors in the deformation, the problem of the thermal deformation cannot be fundamentally solved even if a difference between the coefficient of thermal expansion of the protective film and that of the insulating layer is slightly reduced.

SUMMARY OF THE INVENTION

The object of the present invention is to provide a magnetic head structure by which the protrusion, of a portion of a floating surface near a magnetic pole, toward a disk can be reduced.

The magnetic head structure of the present invention is characterized by comprising a coil, a magnetic pole allowing a magnetic flux generated by the coil to transmit therethrough and forming a magnetic gap, an insulating layer surrounding the coil, and a protective film covering the insulating layer and the magnetic pole, wherein if a first direction is defined as that in which the side of the floating surface of the magnetic head structure extends when viewed in the direction in which the coil, the magnetic pole, the insulating layer, and the protective film are laminated, and a second direction is defined as one perpendicular to the first direction, the ratio of the maximum length of the insulating layer in the first direction to that in the second direction is equal to or greater than 1.5.

According to this configuration, it is possible to reduce the protrusion of the portion of the floating surface near the magnetic pole toward the disk by setting the length of the insulating layer in the first direction to more than 1.5 times longer than that in the second direction. In the prior art, the length of the insulating layer in the first direction was equal to or less than that in the second direction. The first reason for this is that, as the insulating layer is provided only to insulate the coil, the length of the insulating layer in the first direction was thought to be enough if it insulated the coil. The second reason is that, as the length of the insulating layer increases, the quantity of thermal expansion of the insulating layer also increases and the quantity of protrusion of the portion of the floating surface near the magnetic pole was thought to increase. The inventors of the present invention have focused on the fact that the expansion of the insulating layer at a high temperature occurs not only in the direction toward the floating surface but also in the direction transverse to the floating surface. If the insulating layer expands, deformation occurs at the upper part of the coil distant from the floating surface and the component of the insulating layer, which expands in the direction transverse to the floating surface, locally pushes up the protective film on the insulating layer and, therefore, a moment that causes a portion of the protective film on the side of the floating surface to rotate is produced. Owing to this moment, the outer edge of the floating surface deforms toward the disk and the protrusion of the portion of the floating surface near the magnetic pole is suppressed. In particular, by setting the length of the insulating layer in the first direction to more than 1.5 times longer than that in the second direction, the area of deformation at the upper part of the coil increases, the quantity of protrusion toward the floating surface is reduced, the moment increases more effectively, and the quantity of protrusion of the floating surface is reduced.

Particularly, it is desirable that the ratio of the length of the insulating layer in the first direction to that in the second direction be between 1.5 and 6.

The coil may be a multi-layered coil or a single layer coil.

For example, the insulating layer is made of photoresist and the protective film may be made of alumina.

According to the present invention, as described above, it is possible to reduce the protrusion, of a portion of a floating surface, near a magnetic pole.

BRIEF DESCRIPTION OF THE DRAWINGS

The features and advantages of the invention will be more clearly understood from the following description taken in conjunction with the accompanying drawings, in which.

DESCRIPTION OF THE PREFERRED EMBODIMENTS

Figure 1:
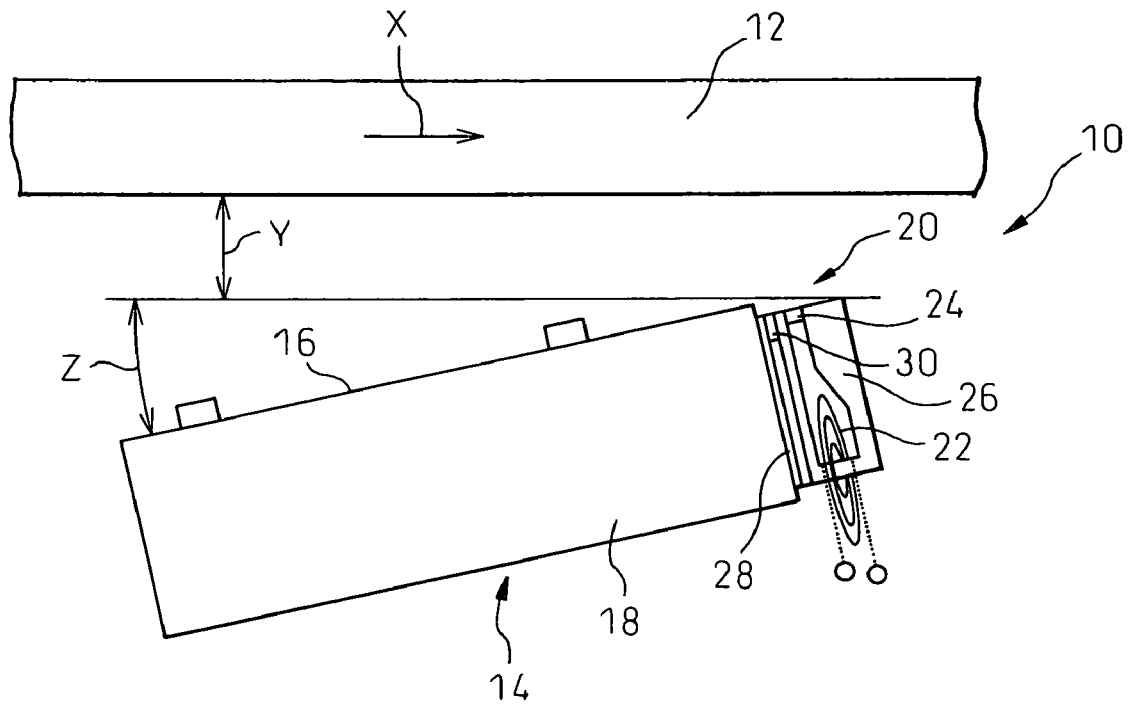
FIG. 1 is a schematic diagram showing a part of a magnetic disk apparatus according to the present invention.
Figure 2:
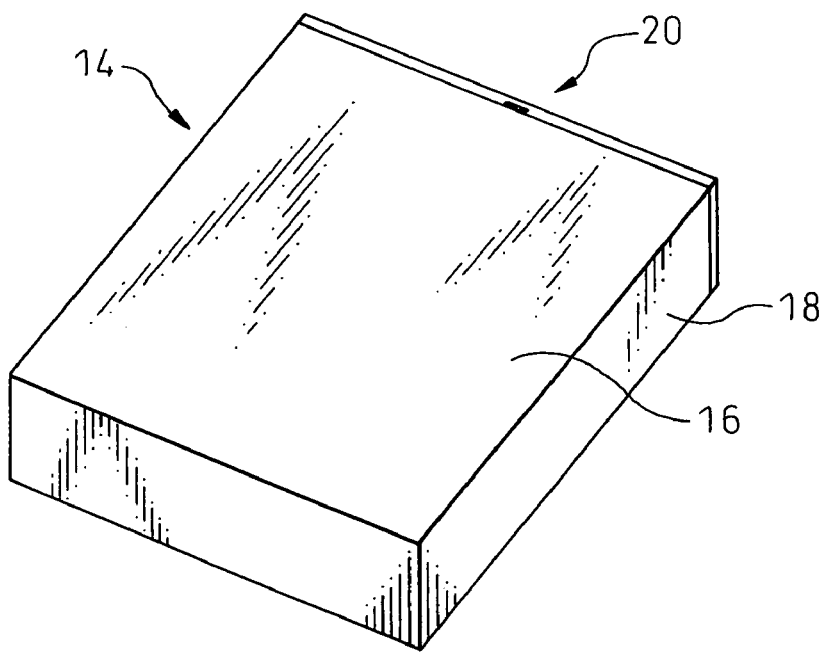
FIG. 2 is a perspective diagram showing a magnetic head slider.

The preferred embodiment of the present invention will now be explained with reference to the accompanying drawings. FIG. 1 is a schematic diagram showing a part of a magnetic disk apparatus according to the present invention. FIG. 2 is a perspective diagram showing a magnetic head slider.

A magnetic disk apparatus 10 includes a disk 12 and a magnetic head slider 14. The magnetic head slider 14 has a floating surface 16 and a floating rail (not shown). In operation, the disk 12 rotates in the direction shown by the arrow X, and the magnetic head slider 14 floats with respect to the disk 12 by the quantity of floating Y with a pitch angle Z. The quantity of floating Y is, for example, approximately 10 nm.

The magnetic head slider 14 comprises a substrate 18 forming a slider body and a magnetic head structure 20 provided on the substrate 18. The magnetic head structure 20 is formed by laminating thin films of several materials on the substrate 18. The magnetic head structure 20 has a coil 22 formed on the end of the substrate 18 and a magnetic pole 26 allowing a magnetic flux generated by the coil 22 to transmit therethrough and forming a magnetic gap 24. Further, a shield 28 and a reading element (MR element) 30 are provided on the substrate 18.

When data are written to the disk 12, an electric current is supplied to the coil 22. The electric current flowing through the coil 22 generates a magnetic flux and the magnetic flux leaking from the magnetic gap 24 of the magnetic pole 26 writes data into the disk 12. On the other hand, when data are read from the disk 12, data are read by the reading element 30. Recently, the quantity of floating of the magnetic head slider 14 has been reduced in order to increase the recording density and, for example, the quantity of the floating has been reduced to equal to or less than 10 nm.

Figure 3:
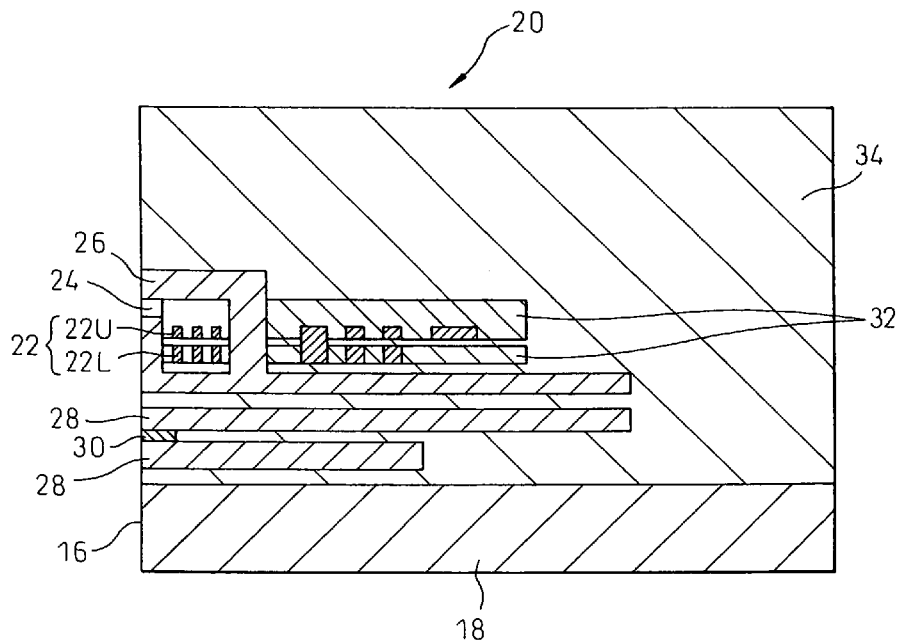
FIG. 3 is a cross-sectional diagram showing a magnetic head structure.

FIG. 3 is a cross-sectional diagram showing the magnetic head structure 20. FIG. 3 shows only a part of the substrate 18, that is, only a part of the end of the substrate 18 shown in FIG. 1 and FIG. 2. The magnetic head structure 20 has the coil 22 and the magnetic pole 26. The coil 22 has a two-layered structure comprising an upper coil 22U and a lower coil 22L, and the central portions of the upper coil 22U and the lower coil 22L are connected to each other. Further, two layers of the shield 28 are provided on the substrate 18 and the reading element (MR element) 30 is arranged between the two layers of the shield 28.

Furthermore, the magnetic head structure 20 includes an insulating layer 32 surrounding the coil 22 and a protective film 34 covering the insulating layer 32 and the magnetic pole 26. The insulating layer 32 has a two-layered structure corresponding to the two-layered coil 22 (22U and 22L). These elements are formed by laminating thin films. The protective film 34 has a considerable thickness and is also formed between the above-mentioned several layers. Here, the longitudinal direction in FIG. 3 is referred to as a lamination direction.

The substrate 18 is made of $Al_2O_3$—TiC, the coil 22 is made of copper, the magnetic pole 26 and the shield 28 are made of magnetic material such as NiFe, the protective film 34 is made of alumina, and the insulating layer 32 made of resin material such as a photoresist. The whole magnetic head structure 20 is covered with the protective film 34 made of a material such as alumina and the coil 22 and the insulating layer 32, which have coefficients of thermal expansion different from that of the protective film 34, are arranged within the magnetic head structure 20. The coefficient of thermal expansion of alumina forming the protective film 34 is $5.8 \times 10^{-6}$, the coefficient of thermal expansion of copper forming the coil 22 is $17.2 \times 10^{-6}$, the coefficient of thermal expansion of Permalloy, which is a magnetic material, forming the magnetic pole 26 and the shield 28 is $10 \times 10^{-6}$, and the coefficient of thermal expansion of photoresist forming the insulating layer 32 is $30\text{-}70 \times 10^{-6}$. The coefficient of thermal expansion of copper or the magnetic material is approximately two or three times greater than that of alumina and the coefficient of thermal expansion of photoresist is approximately 10 times greater than that of alumina.

In FIG. 3, the insulating layer 32 has a constant thickness and is formed so that its length is slightly longer than the area in which the coil 22 exists in the cross-sectional diagram shown in FIG. 3.

Figure 4:
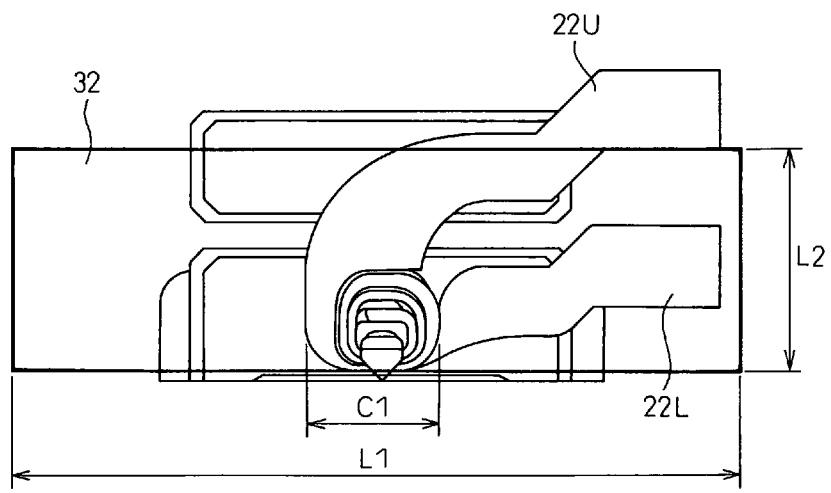
FIG. 4 is a diagram of the magnetic head structure when viewed in the lamination direction.

FIG. 4 is a diagram showing the form of the coil 22 and the insulating layer 32 when the magnetic head structure 20 is viewed in the lamination direction. Here, the transverse direction in FIG. 4 is referred to as a first direction and the longitudinal direction in FIG. 4 is referred to as a second direction. As shown schematically, the insulating layer 32 has a width L1 in the first direction and a width L2 in the second direction, and L1>1.5 L2. Also, the coil 22 has a two-layered structure comprising the upper coil 22U and the lower coil 22L. As shown schematically, the width of the coil 22 in the first direction is C1.

Figure 5:
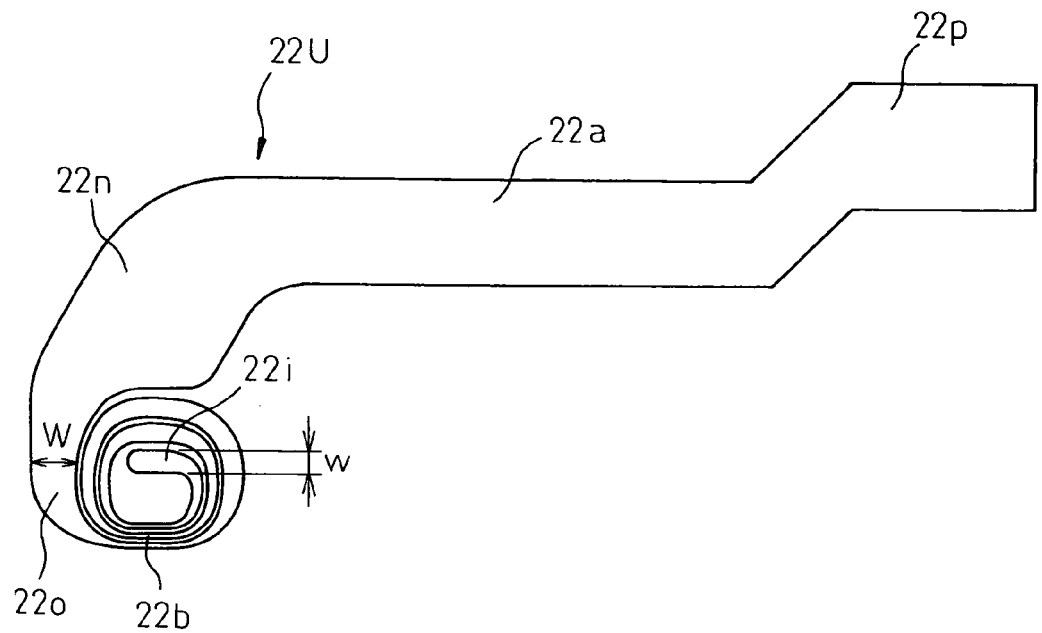
FIG. 5 is a top plan view showing an upper coil of a coil having a two-layered structure.
Figure 6:
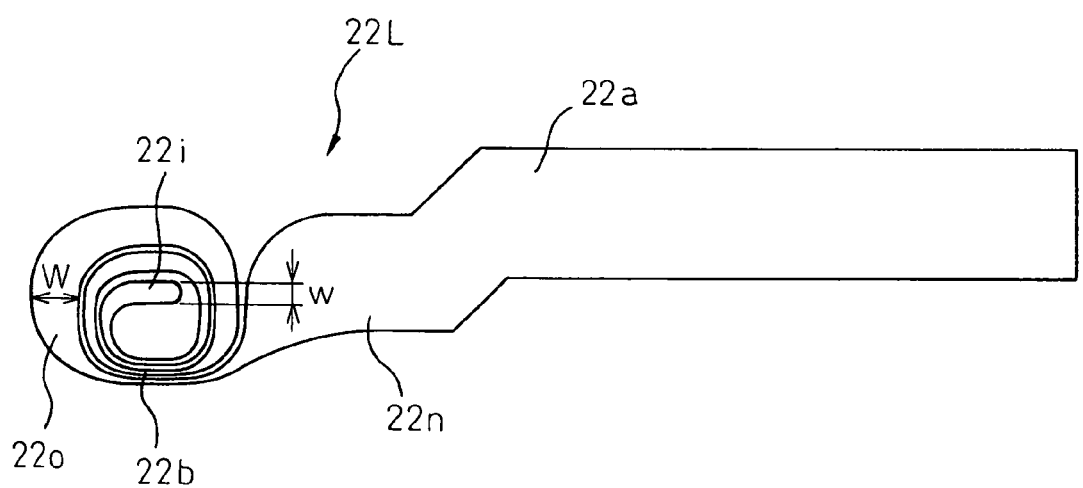
FIG. 6 is a top plan view showing a lower coil of the coil having a two-layered structure.

FIG. 5 is a top plan view showing the upper coil 22U of the coil having a two-layered structure. FIG. 6 is a top plan view showing the lower coil 22L of the coil having a two-layered structure. The inner end of the upper coil 22U and the inner end of the lower coil 22L are connected to each other.

Each of the coils 22U and 22L have a lead 22a and a coil portion 22b. The coil portion 22b has a coil inner circumferential portion 22i and a coil outer circumferential portion 22o. Each of the coils 22U and 22L is formed so that a width W of the coil outer circumferential portion 22o is more than twice greater than a width w of the coil inner circumferential portion 22i.

Figure 7:
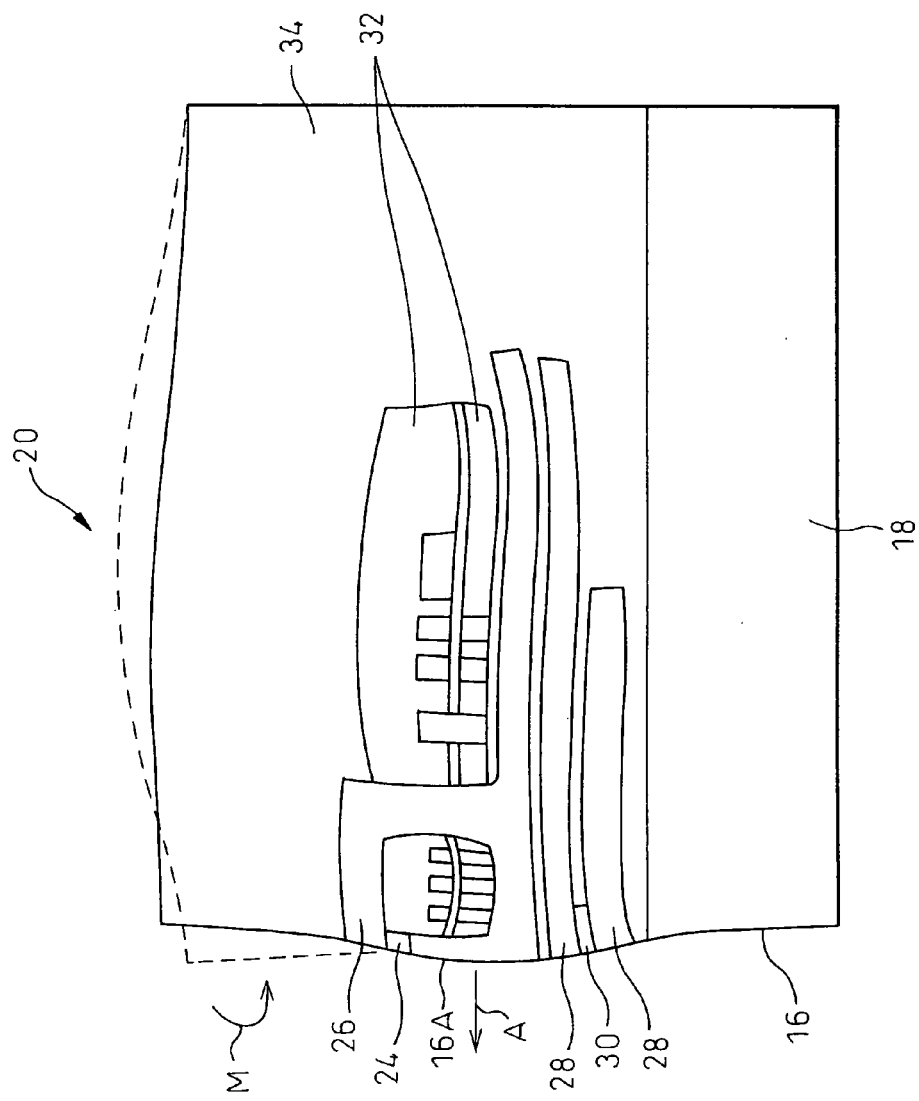
FIG. 7 is a cross-sectional diagram showing a thermal deformation of the magnetic head structure.

FIG. 7 is a cross-sectional diagram showing a thermal deformation of the magnetic head structure and the thermal deformation is calculated using the finite element method. The solid line shows the deformation in the prior art and the broken line shows the deformation in the present invention. The constituent elements of the magnetic head structure in the prior art have a configuration similar to that shown in FIG. 3 but the width L1 of the insulating layer 32 in the first direction (transverse direction) in the prior art is equal to or less than the width L2 in the second direction (longitudinal direction). In other words, $L1 \leq L2$. In FIG. 7, it will be seen that the thermal deformation is caused mainly by the difference in coefficient of thermal expansion between the insulating layer 32 and the protective film 34. Particularly, the deformation occurs in such a manner that a portion 16A of the floating surface 16 near the magnetic pole protrudes most considerably toward the disk 12 as shown by the arrow A. The quantity of floating of the magnetic head slider 14 has reached the range of equal to or less than 10 nm and if the quantity of protrusion of the portion 16A increases, the minimum quantity of floating of the magnetic head slider 14 is substantially reduced and there arises the possibility that the portion 16A of the floating surface 16 at which the coil 22 is located comes into contact with the disk 12. The quantity of protrusion of the portion 16A near the magnetic pole in question is a quantity of protrusion from a line connecting the position of the floating surface 16 on the substrate 18 and the position of the floating surface 16 at the front end of the protective film 34 because the magnetic head floats as shown in FIG. 1.

The applicants and the inventors of the present invention have disclosed a configuration capable of reducing the quantity of protrusion of the portion 16A near the magnetic pole by increasing the volume of the insulating layer 32 in Japanese Patent Application No. 2004-99055. An increase in volume of the insulating layer 32 is realized by extending the insulating layer 32 in the opposite direction of the floating surface or by providing a layer made of the same photoresist material as that of the insulating layer 32 in the opposite direction of the floating surface or in the lamination direction with respect to the insulating layer 32.

As described in Japanese Patent Application No. 2004-99055, if the volume of the insulating layer 32 is increased to greater than a certain value, the protective film 34 is deformed in the manner shown by the broken line in FIG. 7 and it is possible to reduce the quantity of protrusion of the portion 16A of the floating surface 16 near the magnetic pole in the direction shown by the arrow A.

Normally, when the width of the insulating layer 32 increases, the quantity of thermal expansion of the insulating layer 32 also increases, therefore, it is thought that the quantity of protrusion of the portion 16A of the floating surface 16 near the magnetic pole increases. The inventors of the present invention, who are also the inventors of Japanese Patent Application No. 2004-99055, have focused on the fact that the expansion of the insulating layer 32 at a high temperature occurs not only in the direction toward the floating surface 16 but also in the direction transverse to the floating surface 16.

If the insulating layer 32 expands, the component of the insulating layer 32, which expands in the direction transverse to the floating surface 16, locally pushes up a part of the protective film 34 on the insulating layer 32 and, therefore, a moment M, that causes a portion of the floating surface 16 at which the protective film 34 is located to rotate, is produced. Owing to this moment M, the outer edge of the floating surface 16 (the upper-leftmost end of the protective film 34 in FIG. 7) deforms toward the disk 12 and the protrusion of the portion 16A of the floating surface 16 near the magnetic pole is suppressed.

Therefore, by increasing the volume of the insulating layer 32 having a large coefficient of thermal expansion, it is possible to reduce the protrusion of the portion 16A of the floating surface 16 near the magnetic pole. By the way, the thicker the protective film 34 covering the insulating layer 32, the greater the volume of the material of the insulating layer 32 must be in order to deform the protective film 34 so as to reduce the protrusion of the portion 16A of the floating surface 16 near the magnetic pole.

However, Japanese Patent Application No. 2004-99055 only describes increasing the volume of the insulating layer 32 and the relationship between the width L1 of the insulating layer 32 in the first direction and the width L2 in the second direction is not described in particular. As a result of a further examination, the inventors of the present invention have found that not only the volume of the insulating layer 32 but also the relationship between the width L1 of the insulating layer 32 in the first direction and the width L2 in the second direction is important.

Particularly, in the present invention, as shown in FIG. 4, if the width L1 of the insulating layer 32 in the first direction (transverse direction) is set to more than 1.5 times longer than the width L2 in the second direction (longitudinal direction), the quantity of deformation at the upper portion of the coil 22 increases and, as a result, the quantity of protrusion toward the floating surface is reduced, the moment effectively increases, and the quantity of protrusion at the floating surface is reduced.

Figure 8:
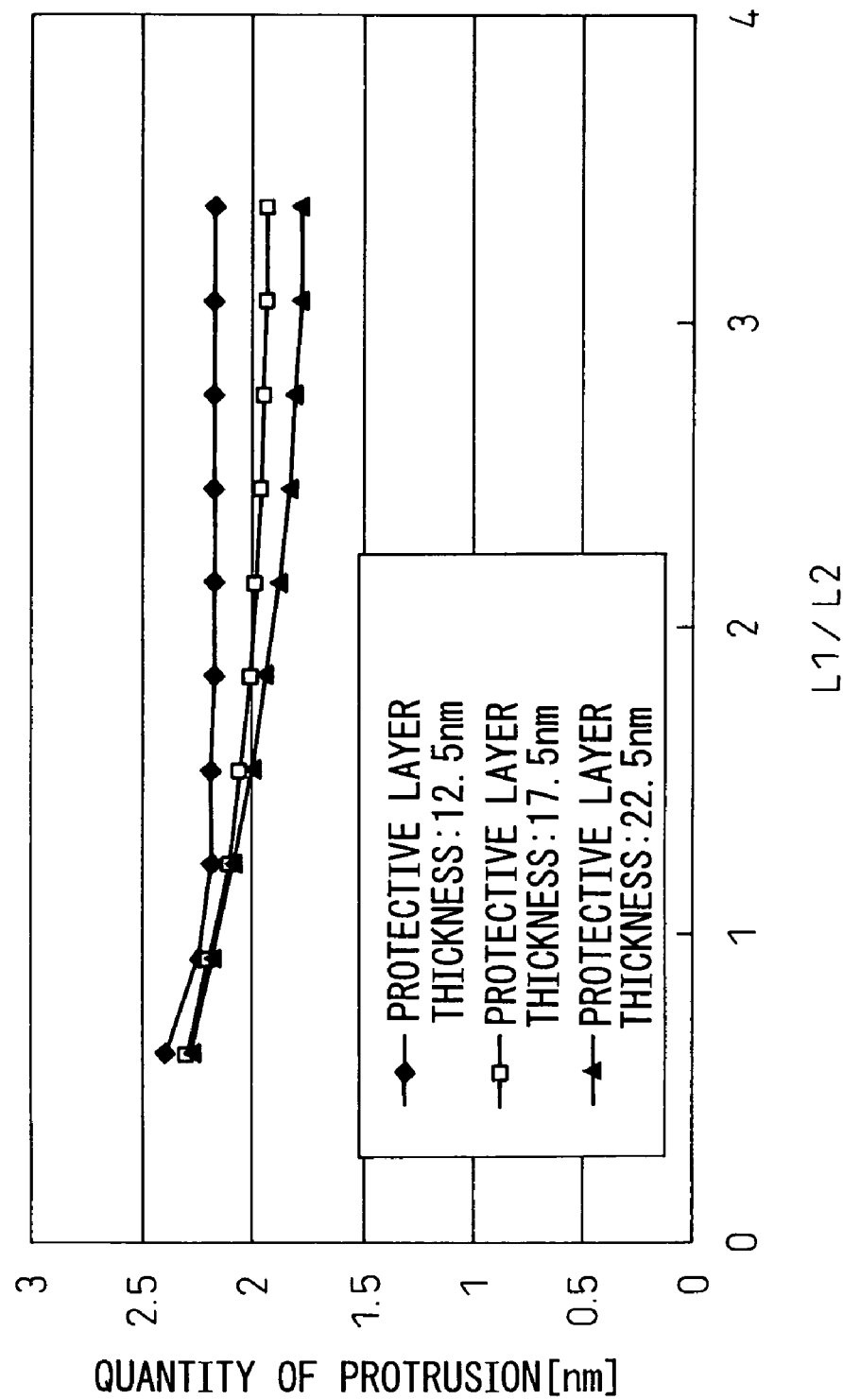
FIG. 8 is a diagram showing the change in the quantity of protrusion when the width-to-length ratio of an insulating layer is changed.

FIG. 8 shows a simulation of the change in the quantity of protrusion when the length L2 of the insulating layer 32 in the longitudinal direction is set to a constant value of 65 μm and the width L1 in the transverse direction is changed. The thickness of the protective film 34 is set to 12.5 μm, 17.5

μm, and 22.5 μm. In this case, L1/L2 as well as the volume of the insulating layer 32 changes. From this result, it will be understood that when the value of L1/L2 increases, the quantity of protrusion is reduced and becomes constant at a certain value or greater. This is thought to be because the photoresist of the insulating layer 32 having a transversely elongated structure reduces the quantity of protrusion and when the volume of the photoresist reaches a certain value in accordance with the thickness of the protective film 34, the reduction effect thereof saturates.

Figure 9:
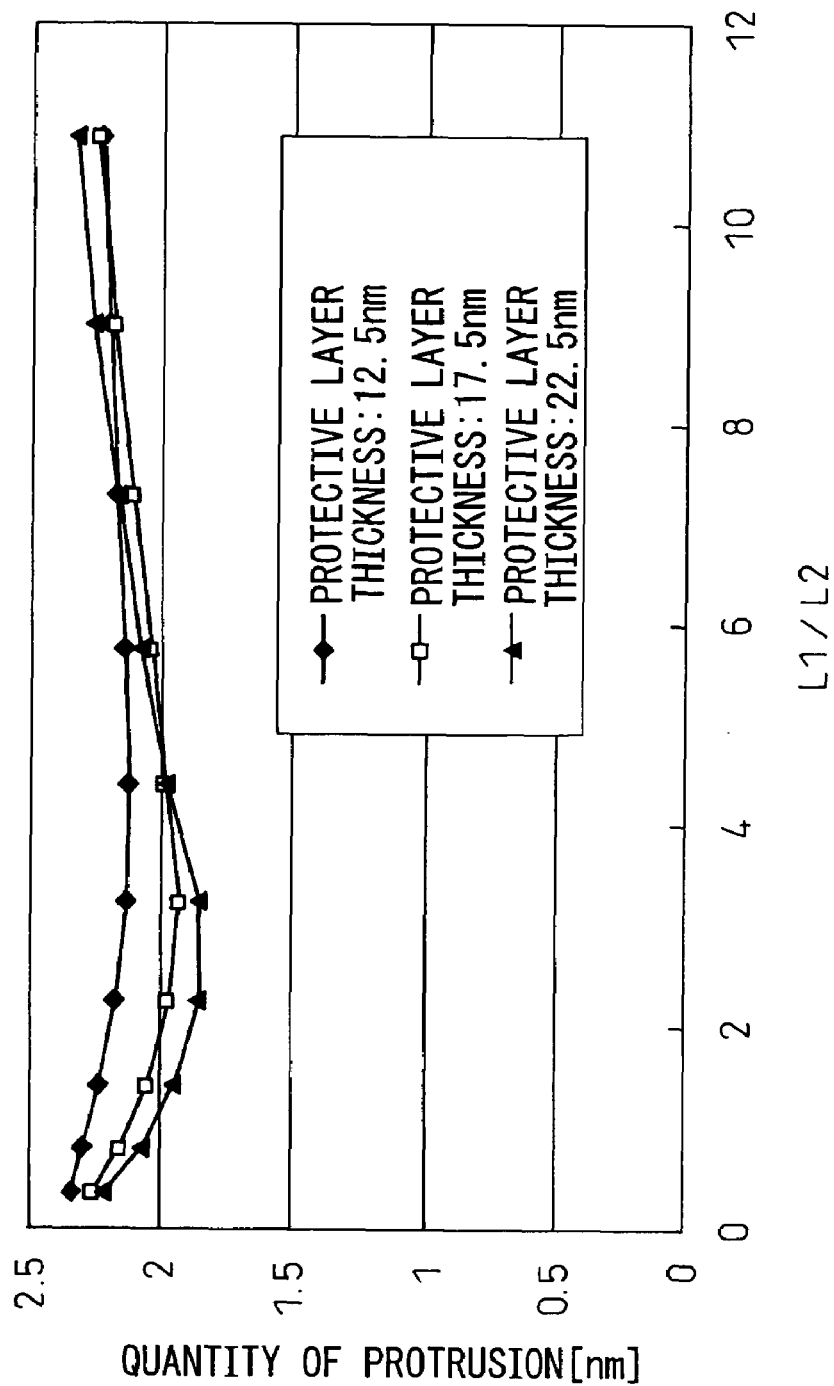
FIG. 9 is a diagram showing the change in the quantity of protrusion when the width-to-length ratio of the insulating layer is changed under other conditions.

FIG. 9 is a diagram showing a change in the quantity of protrusion of the portion 16A near the magnetic pole when the volume of the insulating layer 32 is set to a constant value and the value of L1/L2 is changed. In this case also, the thickness of the protective film 34 is set to 12.5 μm, 17.5 μm, and 22.5 μm. As the volume of the insulating layer 32 is constant and the value L1/L2 changes, if L1/L2 increases, L1 increases and L2 decreases, or the thickness of the insulating layer 32 is reduced.

From the result shown in FIG. 9, it will be understood that the quantity of protrusion has a local minimum value when the ratio L1/L2, that is, the ratio of the width L1 of the insulating layer 32 in the transverse direction to the width L2 in the longitudinal direction is greater than 1.5. Although the ratio L1/L2 for the local minimum value differs depending on the thickness of the insulating film 34, it will be understood that the ratio is approximately between 1.5 and 6. Further, as the thickness of the protective film 34 becomes greater, the position of the local minimum value of the quantity of protrusion of the portion 16A moves toward smaller values of the ratio L1/L2.

The present invention is characterized by trying to reduce the quantity of protrusion of the portion 16A by utilizing the above-mentioned mechanism. However, if the width-to-length ratio L1/L2 of the insulating layer (photoresist) 32 is too large, the effect on reducing the quantity of protrusion of the portion 16A cannot be expected any longer and, therefore, it is important to determine a width-to-length ratio of the insulating layer 32 in a predetermined range including a local minimum value in accordance with the thickness of the protective film 34.

Figure 10:
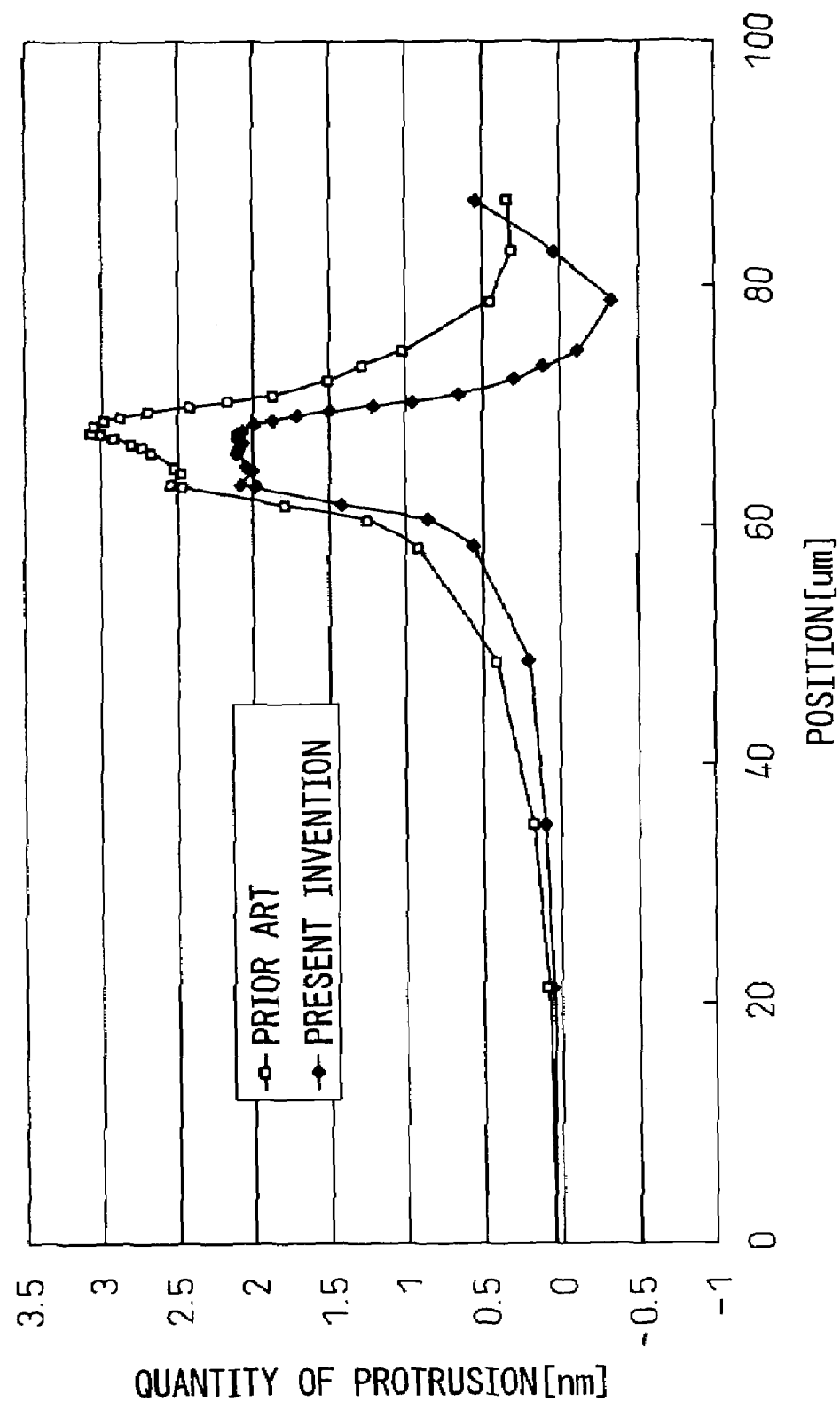
FIG. 10 is a diagram showing the displacement of a floating surface of the magnetic head structure in the present invention and in the prior art.

FIG. 10 is a diagram showing a comparison between the displacement of the floating surface of the magnetic head structure in the present invention and that in the prior art. In the magnetic head structure according to the present invention, L1 is 50 μm, L2 is 200 μm, and L1/L2 is 4.0 and in the magnetic head structure according to the prior art, L1 and L2 are 40 μm and L1/L2 is 1.0, and the thickness of the protective film 34 is 12.5 μm in both structures and the width C1 of the coil in the transverse direction is 30 μm. The horizontal axis in FIG. 10 represents the position of the head in the lamination direction on the floating surface and the vertical axis represents the quantity of protrusion (nm). According to the present invention, it will be understood that the maximum value of the quantity of protrusion is reduced by 10% to 20% compared to that in the prior art.

Figure 11:
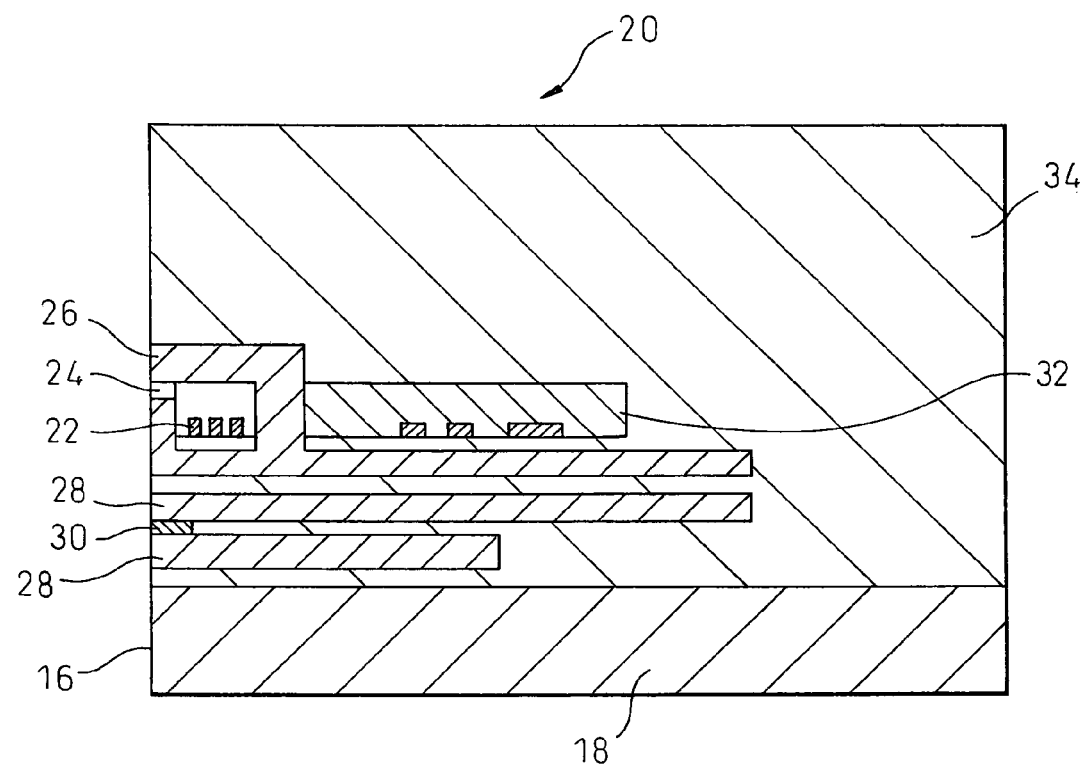
FIG. 11 is a cross-sectional diagram showing a modified example of the magnetic head structure.

Although the embodiment of the present invention is described as above, it is apparent that various modifications of the present invention are possible. For example, in the embodiment described above, the coil 22 is a two-layered coil, but the same effects can be obtained from a single layer coil. FIG. 11 is a cross-sectional diagram of a magnetic head structure having a single layer coil. In FIG. 11, the single layer coil 22 is provided and the volume and L1/L2 of the single layer insulating layer 32 surrounding the coil 22 are increased.

I claim:

1. A magnetic head structure comprising:
   a coil;
   a magnetic pole allowing a magnetic flux generated by the coil to transmit therethrough and forming a magnetic gap;
   an insulating layer surrounding the coil; and
   a protective film covering the insulating layer and the magnetic pole, wherein
   if a first direction is defined as that in which the side of the floating surface of the magnetic head structure extends when viewed in the direction in which the coil, the magnetic pole, the insulating layer, and the protective film are laminated, and a second direction is defined as that perpendicular to the first direction, the ratio of the maximum length of the insulating layer in the first direction to that in the second direction is equal to or greater than 1.5.

2. The magnetic head structure as set forth in claim 1, wherein the ratio is between 1.5 and 6.

3. The magnetic head structure as set forth in claim 2, wherein the coil is a multi-layered coil.

4. The magnetic head structure as set forth in claim 2, wherein the coil is a multi-layered coil.

5. The magnetic head structure as set forth in claim 1, wherein the coil is a single layer coil.

6. The magnetic head structure as set forth in claim 1, wherein the coil is a single layer coil.

* * * * *